United States Patent

[11] 3,612,866

[72] Inventor Brian Stevens
University of South Fla., Tampa, Fla. 33620
[21] Appl. No. 839,875
[22] Filed July 8, 1969
[45] Patented Oct. 12, 1971

[54] INSTRUMENT FOR DETERMINING OXYGEN QUANTITIES BY MEASURING OXYGEN QUENCHING OF FLUORESCENT RADIATION
10 Claims, 6 Drawing Figs.
[52] U.S. Cl. .................................................. 250/71,
23/254, 250/106, 250/43.5
[51] Int. Cl. ........................................................ G01n 21/38
[50] Field of Search ........................................ 250/43.5,
71, 83.3 UV; 23/230, 254

[56] References Cited
UNITED STATES PATENTS
3,285,703   11/1966   Narita et al. ................... 250/71

*Primary Examiner*—William F. Lindquist
*Assistant Examiner*—C. E. Church
*Attorney*—Herman L. Gordon

ABSTRACT: Apparatus for measuring oxygen concentration based on oxygen quenching of molecular luminescence; the quenching is evaluated by comparison with an oxygen-shielded reference member in the same environment, using respective photosensitive detectors responding to fluorescence from an unshielded fluorescing member and the reference member.

PATENTED OCT 12 1971    3,612,866

INVENTOR
BRIAN STEVENS

Herman L. Gordon
BY

ATTORNEY

INSTRUMENT FOR DETERMINING OXYGEN QUANTITIES BY MEASURING OXYGEN QUENCHING OF FLUORESCENT RADIATION

This invention relates to instruments for measuring the gas content of materials, and more particularly to an instrument for the measurement of the oxygen content of liquids or gases.

A main object of the invention is to provide a novel and improved apparatus for the measurement of oxygen concentration in liquids or gases, the apparatus being based on the luminescence-quenching effect of oxygen on aromatic molecules, their derivatives and aliphatic ketones.

A further object of the invention is to provide an improved apparatus for the measurement of oxygen concentration in liquids or gases, the apparatus requiring relatively simple components, being reliable in operation, and being highly sensitive.

A still further object of the invention is to provide an improved apparatus for measuring oxygen concentration in liquids or gases, the apparatus being relatively compact in size, being highly portable, involving relatively inexpensive components, and allowing monitoring of oxygen concentration in gaseous or liquid environments substantially without interference with environmental flow or circulation.

Further objects and advantages of the invention will become apparent from the following description and claims, and from the accompanying drawings, wherein:

Figure 1:
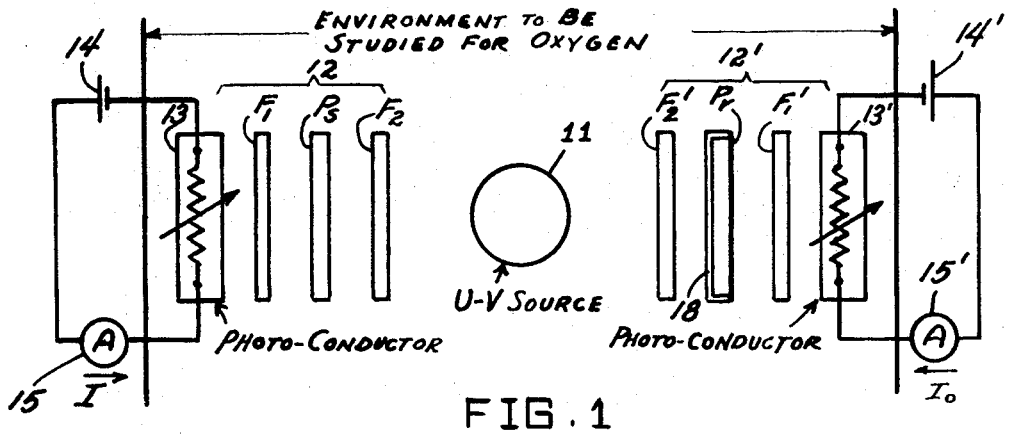
FIG. 1 is a diagrammatic view of one form of oxygen-measuring apparatus constructed in accordance with the present invention.

The measurement of oxygen concentrations according to the principle of the present invention is based on the quenching action of oxygen on the molecular luminescence (fluorescence and/or phosphorescence) of aromatic molecules, their derivatives, and aliphatic ketones.

The ratio of the normal fluorescence intensity $I_o$ to the fluorescence intensity $I$ of one of the above materials when it is exposed to molecular oxygen at a concentration $(O_2)$ is given by the following equation:

$I_o/I = 1 + kq_r(O_2)$ where $k_q$ is the bimolecular quenching rate constant and $1/\tau$ is the fluorescence decay constant of the luminescent molecule in the absence of oxygen.

In a given system the change in luminescence intensity due to oxygen quenching thus depends on:

a. The bimolecular quenching rate constant $k_q$, and
b. The lifetime $\tau$ of the emitting species.

In benzene solution at 25° C. for example, where $k_q = 2 \times 10^{10}$ lit.mol.$^{-1}$ sec.$^{-1}$ and $\tau$ is typically in the region of $10^{-8}$ sec. for a fluorescence emitter, an oxygen concentration of $$(O_2) = \frac{1}{2 \times 10^{10} \times 10^{-8}} = 5 \times 10^{-3} \text{ mol. lit.}^{-1}$$

will reduce the fluorescence intensity to 50 percent of its unquenched value. At the other extreme, the phosphorescence, with a typical lifetime of 1 sec. will have a half-quenching concentration for oxygen of $$(O_2) = \frac{1}{2 \times 10^{10} \times 1} = 5 \times 10^{-11} \text{ mol. lit.}^{-1}$$

in the same solvent. For this reason phosphorescence is rarely observed in fluid media (solutions and gases).

By a suitable choice of the parameters $k_q$ and $\tau$ it is possible to estimate concentrations of environmental oxygen within these limits.

An instrument according to the present invention based on the above-described phenomenon consists essentially of the following three components:

a. An excitation source;
b. the potentially luminescent system which can exchange oxygen with the sample of unknown oxygen concentration and in which the diffusion of molecular oxygen can take place $(k_q > 0)$; and
c. a detector system, preferably with linear response to luminescence intensity.

An instrument according to the present invention can in general be effectively employed for the estimation of dissolved oxygen concentrations in liquids provided that the parameters $k_q$ and $\tau$ are known independently and the liquid is first deoxygenated to obtain $I_o$. To make the instrument acceptably portable, suitable for a wide range of in situ measurements, capable of performing the required measurements within relatively short periods of time, and not readily subject to contamination by components of the sample fluid being examined, a radioactive material may be employed in the luminescent system as the excitation source, and the radioactive and luminescent materials may be dispersed (dissolved) in a polymer film which is permeable to oxygen and which is placed in contact with the gaseous or aqueous sample of unknown oxygen content, a control film impervious to oxygen being employed in a reference emitter to provide the $I_o$ value. A detector system may be employed consisting of two conventional photoelectric or photoconductive devices, the photosensitive surfaces of which are, respectively, coated with radioactive scintillator films which are permeable or impermeable to oxygen; the ratio of signals from the detectors is then equal to the ratio of luminescent intensities emitted by the scintillators in the absence and presence of oxygen, respectively, equilibrated with the sample, in accordance with the above equation for $I_o/I$.

An instrument according to the present invention has a wide range of applications for the measurement of the oxygen content of liquids and gases, for example:

a. in medicine: measurement of the oxygen content of blood;
b. in marine biology: measurement of oxygen content of sea water in situ;
c. in public health: measurement of oxygen content of sewage effluent;
d. in space research: measurement of oxygen content of planetary atmospheres.

Figure 2:
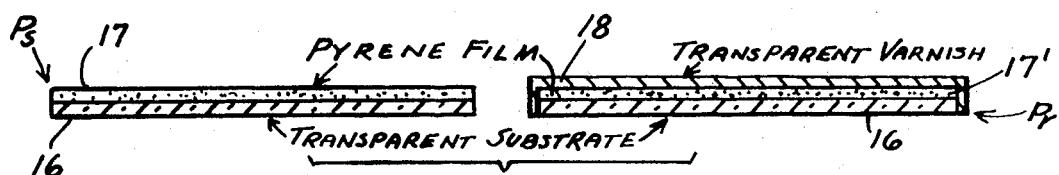
FIG. 2 shows enlarged cross-sectional views of the sensing and reference wafers employed in the apparatus of FIG. 1.

Referring to the drawings, and more particularly to FIGS. 1 and 2, a typical instrument according to the present invention comprises an ultraviolet lamp 11 which serves as the excitation source and which is mounted between the oxygen-sensitive assembly 12 and the reference assembly 12'. The assembly 12 comprises the complementary filters $F_2$ and $F_1$ with the oxygen-sensing luminescent member $P_s$ mounted therebetween and exposed to the environment. A photosensitive detector 13 is mounted in a position to respond to the filtered fluorescent radiation emerging from the exit filter $F_1$. The detector 13 may comprise a photoconductor connected in a circuit with a battery 14 and a sensitive meter 15, whereby a measurement corresponding to the value I can be obtained.

The oxygen-sensing luminescent member $P_s$ typically comprises a thin film of transparent material containing luminescent compound in which rapid diffusion of molecular oxygen from the liquid or gaseous environment can take place. For example, as shown in FIG. 2, the member $P_s$ may comprise a transparent substrate 16 on which a film 17 of pyrene is deposited. The pyrene film fluoresces when excited by a spectral component from source 11 transmitted through filter $F_2$, and similarly, a spectral component of the fluorescence is transmitted through the complementary filter $F_1$ and impinges on the photoconductor 13, changing its resistance and providing a reading on meter 15 corresponding to the fluorescence intensity I. The fluorescence is quenched in accordance with the concentration $(O_2)$ of molecular oxygen in the environment to which the pyrene film 17 is exposed.

The reference assembly 12' on the opposite side of the excitation source 11 is of symmetrically similar structure to the oxygen-sensing assembly 12 except that the pyrene layer 17' of the luminescent member $P_r$ is covered by a layer 18 of transparent varnish, so that the pyrene film 17' is shielded from the molecular oxygen of the environment. Thus, the same spectral component from source 11 is transmitted through a filter $F_2$ 'identical with filter $F_2$ and excites the pyrene film 17', causing it to fluoresce, and a spectral component of the fluorescence is transmitted through the complementary filter $F_1'$, identical with filter $F_1$, and impinges on the reference photoconductor 13', connected in a reference circuit including the battery 14' and meter 15'. This provides the reference fluorescent reading $I_o$.

Figure 3:
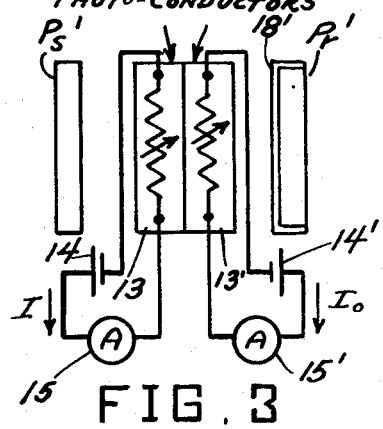
FIG. 3 is a diagrammatic view similar to FIG. 1 but showing a modified form of the apparatus of the present invention.
Figure 4:
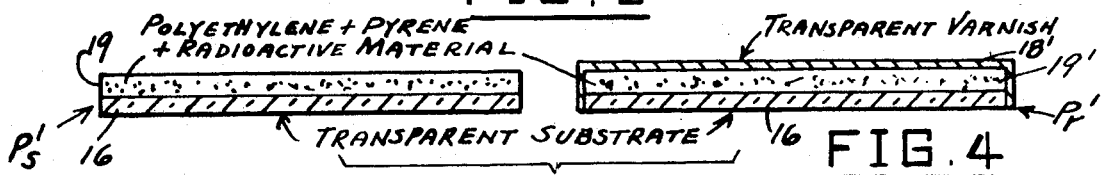
FIG. 4 shows enlarged cross-sectional views of the sensing and reference wafers employed in the apparatus of FIG. 3.

In the modification illustrated in FIG. 3 and 4, the photoconductors 13 and 13' are mounted back-to-back between the oxygen-sensitive assembly $P_s'$ and the reference assembly $P_r'$. The oxygen-sensitive assembly $P_s'$ comprises a thin film of polyethylene or the like, containing the luminescent compound, such as pyrene, and radioactive material, such as Carbon 14. Thus, this film, shown at 19 in FIG. 4, may be mounted on a suitable transparent substrate 16. The reference assembly $P_r$40 is of similar construction except that the fluorescing layer 19' thereof is covered by a layer 18' of transparent varnish. The operation of the instrument of FIGS. 3 and 4 is generally similar to that of the instrument of FIGS. 1 and 2, but the instrument of FIGS. 3 and 4 is obviously much more compact and does not require an externally energized excitation source.

Figure 5:
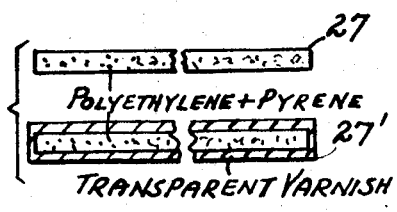
FIG. 5 shows fragmentary cross-sectional views of modifications of the sensing and reference wafers of FIG. 2.
Figure 6:
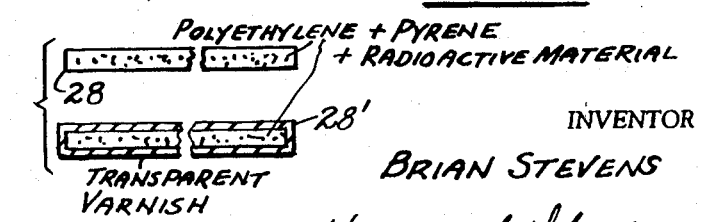
FIG. 6 shows fragmentary cross-sectional views of modifications of the sensing and reference wafers of FIG. 4.

It will be readily understood that in the various embodiments above described, the transparent substrates 16 employed to support the fluorescent material can be omitted if the fluorescent material is mixed with a suitably rigid transparent oxygen-permeable supporting matrix material, such as polyethylene or the like. Thus, the composite wafers 27 and 27' of FIG. 5 can be substituted for the wafers $P_s$ and $P_r$, respectively, of FIGS. 1 and 2, and the composite wafers 28 and 28' of FIG. 6 can be substituted, respectively, for the wafers $P_s'$ and $P_r'$ of FIGS. 3 and 4.

While certain specific embodiments of instruments for the measurement of the oxygen content of liquids and gases have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. An oxygen detector comprising a body of luminescent material in which diffusion of molecular oxygen can take place and which can exchange oxygen with its environment at a substantial rate, whereby to quench its luminescence, means to irradiate the body with excitation radiant energy, photosensitive means located adjacent the body to receive luminescent radiation therefrom, and means to measure the response of the photosensitive means to said luminescent radiation.

2. The oxygen detector of claim 1, and wherein the luminescent material comprises an aromatic compound.

3. The oxygen detector of claim 2, and wherein the luminescent material comprises pyrene.

4. The oxygen detector of claim 1, and wherein the body is in the form of a wafer including oxygen-permeable matrix means.

5. The oxygen detector of claim 4, and wherein the detector is provided with a reference assembly comprising a similar reference wafer coated with transparent oxygen-impervious shielding material, means to irradiate said reference wafer with excitation radiant energy, additional photosensitive means located to receive luminescent radiation from said reference wafer, and means to measure the response of said additional photosensitive means.

6. The oxygen detector of claim 1, and wherein the means to irradiate the body comprises an external source of radiant energy.

7. The oxygen detector of claim 5, and wherein the means to irradiate the wafers comprises a source of radiant energy mounted between the wafers.

8. The oxygen detector of claim 1, and wherein the means to irradiate the body comprises radioactive material.

9. The oxygen detector of claim 1, and wherein the means to irradiate the body comprises radioactive material mixed with the luminescent material.

10. The oxygen detector of claim 5, and wherein the respective photosensitive means are located substantially back-to-back with the wafers located on opposite sides thereof, and wherein the means to irradiate the wafers comprises radioactive material mixed with the luminescent material of the wafers.